US011386162B1

(12) United States Patent
Tao et al.

(10) Patent No.: US 11,386,162 B1
(45) Date of Patent: Jul. 12, 2022

(54) SYSTEMS AND METHODS FOR MACHINE LEARNING-ENHANCED PAIRING OF USER SEARCH STIMULI-TO-ONLINE DIGITAL PROFILE DATA

(71) Applicant: Trusli Inc., Middletown, DE (US)

(72) Inventors: Meng Tao, San Francisco, CA (US); Yi Qiao, Saratoga, CA (US)

(73) Assignee: Trusli Inc., Middleton, DE (US)

( * ) Notice: Subject to any disclaimer, the term of this patent is extended or adjusted under 35 U.S.C. 154(b) by 0 days.

(21) Appl. No.: 17/687,229

(22) Filed: Mar. 4, 2022

(51) Int. Cl.
  *G06F 7/00* (2006.01)
  *G06F 16/903* (2019.01)
  *G06N 20/00* (2019.01)
  *G06N 5/04* (2006.01)

(52) U.S. Cl.
  CPC ......... *G06F 16/90335* (2019.01); *G06N 5/04* (2013.01); *G06N 20/00* (2019.01)

(58) Field of Classification Search
  CPC ............. G06F 16/90335; G06F 16/951; G06F 16/9535; G06F 40/30; G06F 40/295; G06F 40/247; G06N 20/00; G06N 5/04
  See application file for complete search history.

(56) References Cited

U.S. PATENT DOCUMENTS

| 11,228,810 | B1* | 1/2022 | Arazi | H04N 21/4668 |
|---|---|---|---|---|
| 2019/0206271 | A1* | 7/2019 | Cosyn | G09B 5/06 |
| 2020/0257748 | A1* | 8/2020 | Bellare | G06F 40/30 |
| 2021/0377201 | A1* | 12/2021 | D'Agostino | G06Q 30/0239 |
| 2022/0092087 | A1* | 3/2022 | Raghuramu | H04L 63/20 |

* cited by examiner

*Primary Examiner* — Mohammad A Sana
(74) *Attorney, Agent, or Firm* — Padowithz Alce; Chandler Scheitlin; Alce PLLC

(57) ABSTRACT

A system and method for pairing user stimuli-to-online digital profile data includes receiving user stimulus data; computing a classification inference, by a machine learning-based model, based on features extracted from the user stimulus data, wherein the classification inference includes a machine learning-based classification label identified from a plurality of digital profile subdomain classification labels; constructing a digital profile search query, wherein constructing the digital profile search query includes: deriving a digital profile search parameter based on the machine learning-based classification label, and defining the digital profile search query using the digital profile search parameter; executing the digital profile search query, wherein executing the digital profile search query includes: searching a corpus of digital profile data based on the digital profile search parameter; and selectively pairing the digital profile search query to digital profiles of the corpus of digital profile data based on the search parameter; and displaying the digital profiles.

20 Claims, 4 Drawing Sheets

200

```
┌─────────────────────────────────────────────┐
│ Configuring one or more Machine Learning-Based │
│         Classification Models S205             │
└─────────────────────────────────────────────┘

┌─────────────────────────────────────────────┐
│ Sourcing User Enrichment Data for a Target Online User S210 │
└─────────────────────────────────────────────┘

┌─────────────────────────────────────────────┐
│ Identifying and Pre-processing User Stimulus Data associated │
│         with the Target Online User S220       │
└─────────────────────────────────────────────┘

┌─────────────────────────────────────────────┐
│ Classifying or Labeling the User Stimulus Data into one or │
│   more Digital Profile Subdomain Categories S230 │
└─────────────────────────────────────────────┘

┌─────────────────────────────────────────────┐
│ Posing Subdomain-Informed Queries to the Target Online │
│                 User S240                      │
└─────────────────────────────────────────────┘

┌─────────────────────────────────────────────┐
│ Dsplaying Digital Profiles or Digital Accounts to the Target │
│             Online User S250                   │
└─────────────────────────────────────────────┘

┌─ ─ ─ ─ ─ ─ ─ ─ ─ ─ ─ ─ ─ ─ ─ ─ ─ ─ ─ ─ ─ ─ ┐
│ Transmitting User Communication Requests to one or more of │
│    the Digital Profiles or Digital Acccounts S260 │
└─ ─ ─ ─ ─ ─ ─ ─ ─ ─ ─ ─ ─ ─ ─ ─ ─ ─ ─ ─ ─ ─ ┘
```

FIGURE 2

SYSTEMS AND METHODS FOR MACHINE LEARNING-ENHANCED PAIRING OF USER SEARCH STIMULI-TO-ONLINE DIGITAL PROFILE DATA

TECHNICAL FIELD

This invention relates generally to the computer-based searching and digital data retrieval technology fields, and more specifically to new and useful systems and methods for intelligently pairing user stimuli-to-online digital profile data using machine learning.

BACKGROUND

Modern online users may typically search for information on the World Wide Web using a search engine. Typically, online users may provide textual input to the search engine and request that the search engine conduct a search for digital items containing the textual input. Depending on the textual input, the digital items identified from the search may be voluminous and of a variety of different content types that may or may not be relevant to an objective of the online user. In many of these instances, the information being searched by these online users require domain-specific knowledge and/or contextual knowledge, however, typical search engines may not have domain-specific configurations and may fail to perform satisfactory and/or accurate search functions for queries requiring domain-specific knowledge.

Therefore, there is a need in the art for intelligently pairing digital profiles and/or digital resource assets associated with digital profiles to online users based on any form or type of user input. The embodiments of the present application described herein provide technical solutions that address, at least, the needs described above, as well as the deficiencies of the state of the art.

BRIEF SUMMARY OF THE INVENTION(S)

In one embodiment, a computer-implemented method for machine learning-informed pairings of user stimuli-to-online digital profile data includes receiving, via an Internet-accessible user interface, user stimulus data associated with an input of an online user; computing one or more classification inferences, by one or more machine learning-based classification models, based on one or more features extracted from the user stimulus data, wherein the one or more classification inferences comprise one or more machine learning-based classification labels identified from a plurality of distinct digital profile subdomain classification labels; automatically constructing, by one or more computers, a digital profile search query, wherein constructing the digital profile search query includes: deriving one or more digital profile search parameters based on the one or more machine learning-based classification labels, and defining the digital profile search query using, at least, the one or more digital profile search parameters; automatically executing, by the one or more computers, the digital profile search query, wherein the executing of the digital profile search query includes: automatically searching, by the one or more computers, a database comprising a corpus of digital profile data based on the digital profile search parameters; and selectively pairing the digital profile search query to one or more digital profiles identified from the corpus of digital profile data based on the digital profile search parameters; and displaying, via the Internet-accessible user interface, the one or more digital profiles based on the selective pairing.

In one embodiment, the corpus of digital profile data is indexed according to the plurality of distinct digital profile subdomain classification labels, and each distinct digital profile classification label indexed in the corpus of digital profile data corresponds to a distinct set of digital profiles.

In one embodiment, the one or more classification inferences that comprise the one or more machine learning-based classification labels includes: a first machine learning-based classification label corresponding to a first digital profile subdomain classification label of the plurality of distinct digital profile subdomain classification labels, wherein the first digital profile subdomain classification label is associated with a first digital profile domain; and a second machine learning-based classification label corresponding to a second digital profile subdomain classification label of the plurality of distinct digital profile subdomain classification labels, wherein the second digital profile subdomain classification label is outside the scope of the first digital profile domain.

In one embodiment, the digital profile search query includes a first digital profile search parameter based on the first machine learning-based classification label and a second digital profile search parameter based on the second machine learning-based classification label; and selectively pairing the digital profile search query to the one or more digital profiles, includes: identifying a first set of digital profiles based on the first digital profile search parameter, wherein each digital profile of the first set of digital profiles includes a first digital profile tag that is associated with the first digital profile search parameter; identifying a second set of digital profiles based on the second digital profile search parameter, wherein each digital profile of the second set of digital profiles includes a second digital profile tag that is associated with the second digital profile search parameter; and identifying a third set of digital profiles based on a combination of both of the first digital profile search parameter and the second digital profile search parameter, wherein each digital profile of the third set of digital profiles includes both the first digital profile tag and the second digital profile tag.

In one embodiment, displaying the one or more digital profiles includes displaying the first set of digital profiles, the second set of digital profiles, and the third set of digital; and the digital profiles associated with the first set of digital profiles, the second set of digital profiles, and the third set of digital profiles are visually arranged on the Internet-accessible user interface according to a digital profile prioritization criterion.

In one embodiment, the digital profile prioritization criteria visually arrange the digital profiles associated with the first set of digital profiles, the second set of digital profiles, and the third set of digital profiles in a descending order based on a digital profile tag match frequency.

In one embodiment, a search syntax of the digital profile search query is derived from one or more search requirements of the corpus of digital profile data.

In one embodiment, selectively pairing the digital profile search query to the one or more digital profiles includes: pairing, at a first pairing stage, the digital profile search query with a plurality of digital profiles identified from the corpus of digital profile data, wherein at the first pairing stage the plurality of digital profiles are not displayed on the Internet-accessible user interface; pairing, at a second pairing stage, the digital profile search query with the one or more digital profiles that is a subset of the plurality of digital profiles identified at the first pairing stage, wherein the second paring stage filters out or removes one or more digital profiles of the plurality of digital profiles identified by the first pairing stage based on one or more digital profile tuning parameters.

In one embodiment, the method further includes automatically constructing, by one or more computers, a subdomain-informed search query, wherein constructing the subdomain-informed search query includes: deriving one or more subdomain-informed search parameters based on the one or more machine learning-based classification labels, and defining the subdomain-informed search query using, at least, the one or more subdomain-informed search parameters.

In one embodiment, the method further includes automatically executing, by the one or more computers, the subdomain-informed search query, wherein the executing of the subdomain-informed search query includes: automatically searching, by the one or more computers, a database comprising a corpus of subdomain-informed query data based on the subdomain-informed search parameters; and selectively pairing the subdomain-informed query to one or more subdomain-informed queries identified from the corpus of subdomain-informed query data based on the subdomain-informed search parameters; and displaying, via the Internet-accessible user interface, the one or more subdomain-informed queries based on the selective pairing.

In one embodiment, the method further includes while displaying the one or more digital profiles; receiving a user communication request by a target online user to communicate with a target entity associated with at least one of the one or more digital profiles; and in response to identifying the user communication request, electronically transmitting the user communication request to the at least one of the one or more digital profiles.

In one embodiment, the method further includes while displaying the one or more digital profiles, detecting a user selection to one of the one or more digital profiles; in response to detecting the user section, displaying the one of the one or more digital profiles in an expanded view based on the user selection; and while displaying the one of the one or more digital profiles in the expanded view; transmitting a user communication request to the one of the one or more digital profiles.

In one embodiment, the user stimulus data comprises textual data.

In one embodiment, the user stimulus data comprises one or more strings of textual data and digital image data.

In one embodiment, the user stimulus data comprises utterance data; the method further includes converting the utterance data to textual data.

In one embodiment, a computer-implemented method for machine learning-informed pairings of user stimuli-to-online digital profile data includes at an online digital profile discovery service: receiving, via an Internet-accessible user interface, user stimulus data associated with an input of an online user; computing one or more classification inferences, by one or more machine learning-based classification models, based on one or more features extracted from the user stimulus data, wherein the one or more classification inferences comprise one or more machine learning-based classification labels identified from a plurality of distinct digital profile subdomain classification labels; automatically constructing, by one or more computers, a digital profile search query, wherein constructing the digital profile search query includes: defining the digital profile search query based on the one or more machine learning-based classification labels; automatically executing, by the one or more computers, the digital profile search query, wherein the executing of the digital profile search query includes: automatically searching, by the one or more computers, a database comprising a corpus of digital profile data based on the digital profile search parameters; and selectively pairing the digital profile search query to a plurality of digital profiles identified from the corpus of digital profile data based on the digital profile search parameters; and displaying, via the Internet-accessible user interface, a subset of the plurality of digital profiles based on one or more digital profile tuning parameters defined by the online digital profile discovery service.

In one embodiment, defining the digital profile search query further includes formatting the digital profile search query into a machine-recognizable format based on one or more search syntax requirements of the corpus of digital profile data.

In one embodiment, the corpus of digital profile data is indexed according to the plurality of distinct digital profile subdomain classification labels, and each distinct digital profile classification label indexed in the corpus of digital profile data corresponds to a distinct set of digital profiles.

In one embodiment, a computer-implemented method for machine learning-informed pairings of user stimuli-to-online digital profile data includes receiving, via an Internet-accessible user interface, user stimulus data associated with an input of an online user; computing one or more classification inferences, by one or more machine learning-based classification models, based on one or more features extracted from the user stimulus data, wherein the one or more classification inferences comprise one or more machine learning-based classification labels identified from a plurality of distinct digital profile subdomain classification labels; automatically constructing, by one or more computers, a digital profile search query and a subdomain-informed search query, wherein constructing the digital profile search query and the subdomain-informed search query includes: deriving one or more digital profile search parameters and one or more subdomain-informed search parameters based on the one or more machine learning-based classification labels, and defining the digital profile search query based on the digital profile search parameters and defining the subdomain-informed search query based on the subdomain-informed search parameters; automatically executing, by the one or more computers, the digital profile search query and the subdomain-informed search query, wherein the executing of the digital profile search query and the subdomain-informed search query includes: selectively pairing the subdomain-informed search query to one or more subdomain-informed queries identified from the corpus of subdomain-informed query data based on the subdomain-informed search parameters; selectively pairing the digital profile search query to one or more digital profiles identified from the corpus of digital profile data based on both of the digital profile search parameters and one or more user responses to the subdomain-informed queries; and displaying, via the Internet-accessible user interface, the one or more digital profiles based on the selective pairing.

In one embodiment, the corpus of digital profile data is indexed according to the plurality of distinct digital profile subdomain classification labels, and the corpus of subdomain-informed query data is indexed according to the plurality of distinct digital profile subdomain classification labels.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

Figure 1:
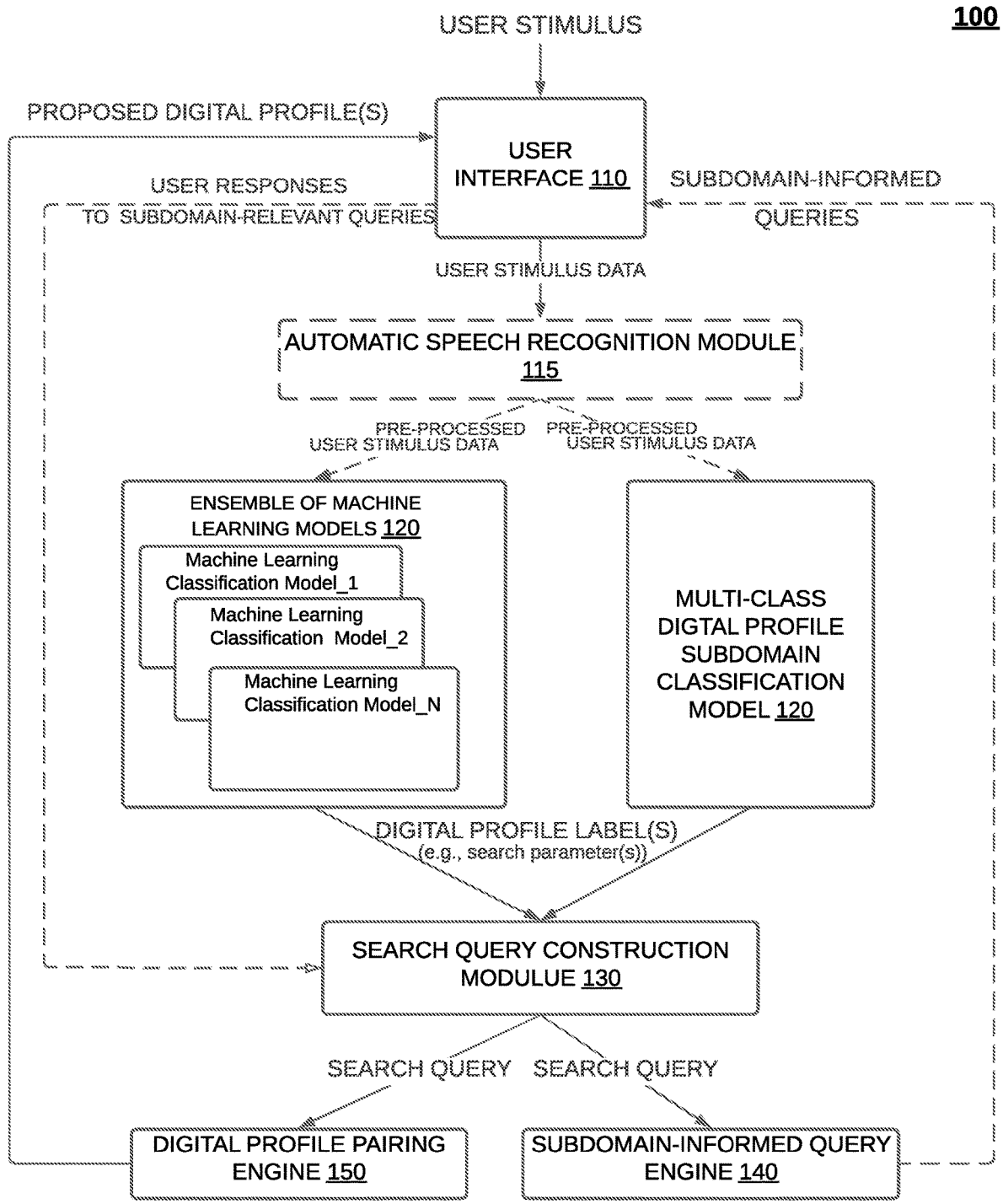
FIG. 1 illustrates a schematic representation of a system 100 in accordance with one or more embodiments of the present application.

1. System for Machine Learning-Based Pairings of User Stimuli-to-Digital Profile Data As shown in FIG. 1, a system 100 for machine learning-based pairing of user stimuli-to-digital profiles may include a user interface 110, a machine learning-based classification system 120, a search query construction module 130, a subdomain-informed query engine 140, and a digital profile pairing engine 150. The system 100 may optionally include an automatic speech recognition module 115. The system 100 may sometimes be referred to herein as a service provider discovery service 100, a user content-to-digital account pairing service 100, or an online digital profile discovery service 100. As described in more detail herein, the service provider discovery service 100 may enable a discovery of any suitable online digital profile data and/or related online digital profile content for a plurality of distinct service provider digital profiles including, but not limited to, lawyer-service provider profiles, health care-service provider profiles, financial services-service provider profiles, insurance services-service provider profile, and/or the like.

In one or more embodiments, each module or engine of the system 100 may be implemented by one or more computing servers, one or more computing processors, or computing servers of a distributed computing system.

1.1 User Interface

In one or more embodiments, the system or service 100 may function to implement a user interface 110 that may preferably function to identify, collect, or ingest user input in any form. The user interface 110 may comprise a search interface that may be digitally accessible to online users over a computing medium, such as the world wide web or the internet. In one or more embodiments, the online users that may be interacting with the user interface no may input a user query in the form of text input, utterance input, and/or image input, and the user interface no may function to identify, collect, or ingest the user query.

In one or more embodiments, the user interface no may be implemented via any suitable computing device and/or from including, but not limited to, a mobile computing device, a personal computing device, a web-browser (having a website displayed therein), or the like. In some embodiments, the user interface no may function to implement one or more graphical user interface objects that may enable online users to continuously or periodically interact with the system 100 via the user interface no. For instance, the user interface no may function to implement one or more text input fields into which online users may freely (e.g., manually) enter a user query (e.g., a user stimulus, a user input, or the like). In one or more embodiments, the user interface 100 may be enabled by a client application operating on a mobile computing device or the like. In such embodiments, the client application may be in operable communication with a client server of the system 100.

In one or more embodiments, based on identifying input of the user query at the user interface 110 (e.g., an Internet-accessible user interface), the user query data associated with the user query may be routed to a machine learning-based classification system and, in some embodiments, the user query data may be optionally routed to an automatic speech recognition module 115 that may convert the user query to text before routing the user query data to the machine learning-based classification system, if needed.

1.2 Machine Learning-Based Inference System|Machine Learning-Based Digital Profile Subdomain Inference System In one or more embodiments, the system 100 may function to implement a machine learning-based digital profile inference system 120 that may preferably function to generate inferences (e.g., classification inferences, including classification labels, entity or slot extraction inferences, and/or the like) (or classify) a target piece of user stimulus data (e.g., pre-processed user stimulus data) into one or more digital profile subdomain categories. The machine learning-based digital profile inference system 120, which may be sometimes referred to herein as a machine learning-based digital profile classification system 120 may be trained for interpreting the user query (e.g., human text), extracting features from the user query, and/or computing digital profile subdomain classification predictions based on the extracted features.

In one or more embodiments, an algorithmic structure underlying the machine learning-based digital profile classification system 120 may be a multi-class digital profile subdomain classification model or an ensemble of digital profile classification models. In one or more embodiments, the multi-class digital profile subdomain classification model may be algorithmically configured and/or specifically trained to generate predictions and/or inferences across a plurality of distinct categories or classes of distinct digital profiles. Accordingly, in such embodiments, the multi-class classification model may function to search unique combination of distinct classes of profiles based on search query input data. The multi-class digital profile subdomain classification model or the ensemble of digital profile classification models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

In one or more embodiments, the classification inference(s) of the machine learning-based digital profile classification system 120 may function to label a target piece of user stimulus data into one or more digital profile subdomain categories that may be used, as input, to a downstream module (e.g., the search query construction module) or engine (e.g., the digital profile pairing engine, the subdomain-informed query engine).

1.3 Search Query Construction Module

In one or more embodiments, the system 100 may function to implement a search query construction module 130 that may preferably function to construct one or more search queries for a target piece of user stimulus data. In one or more embodiments, the search query construction module may function to derive search parameters (for a target piece of user stimulus data) based on the machine learning-based classification label(s) or machine learning-based classification inference(s) predicted by the machine learning-based digital profile classification system 120. In one or more embodiments, the one or more search queries constructed by the search query construction module 130 may be in a machine-understandable format or syntax according to a prescribed search format or search syntax required by at least one of the digital profile pairing engine 150 or the subdomain-informed query engine 140.

In one or more embodiment, the search query construction module may function to construct a subdomain-informed search query that, when executed, may function to search a database comprising a corpus of subdomain-informed query data and match (or pair) the subdomain-informed search query to one or more subdomain-informed queries based on the search parameters of the subdomain-informed query. Additionally, or alternatively, in one or more embodiments, the search query construction module 130 may function to construct a digital profile search query (or digital account search query) that, when executed, may function to automatically search a database comprising a corpus of digital profile data and pair (or match) the digital profile search query to one or more digital profiles data sets (e.g., a plurality of service provider digital profiles, a plurality of digital accounts, or the like).

1.4 Subdomain-Informed Query Engine

In one or more embodiments, the system 100 may function to implement a subdomain-informed query engine 140 that may preferably function to selectively identify and pose one or more subdomain-informed queries to a target online user of the system or service 100. In one or more embodiments, the subdomain-informed query engine 140 may comprise a database comprising a corpus of subdomain-informed query data. In one or more embodiments, the corpus of subdomain-informed query data may be searched using the subdomain-informed search query (e.g., the search parameters of the subdomain-informed search query) constructed by the search query construction module 130. The corpus of subdomain-informed query data may include subdomain-informed queries indexed according to a corresponding digital profile subdomain classification label (e.g., the corpus of subdomain query data may include a plurality of distinct digital profile subdomain classification labels and a distinct set of subdomain-informed queries digitally mapped (or electronically linked) to each of the plurality of distinct digital profile subdomain classification labels).

In one or more embodiments, the subdomain-informed query engine 140 may function to selectively match or selectively pair a subset of subdomain-informed queries of the plurality of subdomain-informed queries of the corpus of subdomain-informed query data to a target subdomain-informed search query. Accordingly, in one or more embodiments, the subset of subdomain-informed query data may be posed to the target user via the user interface 110.

1.5 Digital Profile Pairing Engine

In one or more embodiments, the system 100 may function to implement a digital profile pairing engine 150 that may preferably function to selectively identify and display, via an Internet-accessible user interface 110, one or more digital profiles to a target online user of the system or service 100. In one or more embodiments, the digital profile pairing engine 150 may comprise a database comprising a corpus of digital profile data. In one or more embodiments, the corpus of digital profile data may be searched using the digital profile search query (e.g., the search parameters of the digital profile search query) constructed by the search query construction module 130. The corpus of digital profile data may include digital profiles or digital accounts indexed according to the one or more distinct digital profile subdomain classification labels described above.

In one or more embodiments, the digital profile pairing engine 150 may function to selectively match or selectively pair a subset of digital profiles (e.g., digital accounts) of the plurality of digital profiles (e.g., digital accounts) of the corpus of digital profile data to a target digital profile search query that may be displayed to a target user via the user interface no.

2. Method for Machine Learning-Based Pairings of User Stimuli-to-Digital Profile Data As shown in FIG. 2, the method 200 for machine learning-based pairings of user stimuli-to-digital profiles may include configuring one or more machine learning-based classification models S205, sourcing user enrichment data for a target online user S210, identifying and pre-processing user stimulus data associated with the target online user S220, classifying or labeling the user stimulus data into one or more digital profile subdomain categories S230, posing one or more subdomain-informed queries to the target online user S240, and displaying digital profiles or digital accounts to the target online user S250. The method may optionally include transmitting one or more user communication and/or pairing requests to one or more of the digital profiles or digital accounts S260.

2.05 Configuring One or More Machine Learning-Based Classification Models|Training Data Curation S205, which includes configuring one or more machine learning-based classification models, may function to configure one or more machine learning-based classification models based on one or more corpora of training data. In one or more embodiments, S205 may function to curate one or more corpora of training data and train a target machine learning-based classification model using the one or more corpora of curated training data.

In one or more embodiments, the one or more corpora of training data may include a plurality of historical user queries submitted to publicly accessible online forums. In such embodiments, in a data labeling or processing of the one or more corpora, each historical user query of the plurality of historical user queries may be annotated or labeled with one or more digital profile subdomain classification labels based on the type of entity (or entities) that may have responded to a subject historical user query. In a non-limiting example, a historical user query that may be included in a corpus of training data may have been sourced from an online legal forum, and the historical user query may be labeled or annotated with one or more digital profile subdomain classification labels based on the type of (e.g., legal) entities or (e.g., legal) service providers that may have responded to the historical user query, as described in more detail herein. It shall be noted, in one or more embodiments, S205 may function to construct a distinct corpus of training data for each of a plurality of predetermined classification intents (e.g., each of a plurality of digital profile subdomain classification labels recognized by the system or service 100).

In a first implementation, S205 may function to train a machine learning-based classification model based on the one or more curated corpora of training data. In a second implementation, S205 may function to train a multi-class text classification model based on the one or more curated corpora of training data. In a third implementation, S205 may function to train an ensemble of machine learning-based classification models based on the one or more curated corpora of training data.

It shall be noted that after a training, S205 may function to deploy one of the machine learning-based classification model, the multi-class text classification machine learning-based model, and/or the ensemble of machine learning-based classification models into a production environment.

2.10 Sourcing User Enrichment Data

S210, which includes sourcing user enrichment data, may function to source or collect one or more pieces of user enrichment data for a target online user interacting with at least a portion of the system 100 and/or the method 200. In one or more embodiments, S210 may function to collect one or more pieces of user enrichment data directly from a target online user and/or source one or more pieces of user enrichment data from external (e.g., third party) data repositories. User enrichment data may be collected or sourced for a target online user at any time, for instance, during a target online user enrollment, before input of a user stimulus by the target online user, and/or after input of the user stimulus by the target online user. In one or more embodiments, user enrichment data, as referred to herein, preferably relates to and/or includes data that may inform contextual parameters relating to one or more search stimuli (or for a subject of the one or more search stimuli) provided by an online user or the like. In such embodiments, as a non-limiting example, derived or obtained user enrichment data may inform a computation of an urgency factor, a magnitude factor, and/or similar metrics or context values for the one or more search stimuli and/or the like.

It shall be noted, in one or more embodiments, identifying one or more pieces of user enrichment data that may be associated with a target online user may aid the system 100 and/or the method 200 in building or constructing contextual knowledge associated with the target online user.

User-Provided Enrichment Data

In one or more embodiments, S210 may function to collect user enrichment data during a user enrollment to the system 100 (e.g., a target online user may be in the process of creating a user account on an online medium of the online digital profile discovery service). In such embodiments, during the user enrollment, a system (e.g., the system 100 implementing the method 200) may prompt the target online user with one or more system-default user enrollment queries to which the target user may provide a user response to each of the one or more user enrollment queries. In some embodiments, S210 may function to collect the user response data and compute or predict an urgency score of the target online user and/or a value score of the target online user based on the user response data to the user enrollment queries.

In a variant embodiment, S210 may function to collect user enrichment data directly from a target online user after a user enrollment (e.g., the target user has created a user account on the online resource of the online digital profile discovery service). In such embodiments, S210 may function to prompt the target online user with one or more system-generated queries to which the target online user may provide a user response to each of the one or more system-generated queries. In some embodiments, S210 may function to collect the user response data and compute or predict an urgency (e.g., an urgency score) of the target online user and/or a value (e.g., a value score) of the target online user based on the user response data to the system-generated queries.

System-Gathered User Enrichment Data

Additionally, or alternatively, in one or more embodiments, during or after a target user enrollment, S210 may function to automatically generate a corpus of user enrichment data associated with the target user enrollment based on identifying one or more user data attributes (e.g., name of the target online user, physical address of the target online user, zip code of the target online user, etc.). For instance, in one or more embodiments, S210 may function to automatically construct or generate one or more API calls to one or more publicly accessible data repositories (e.g., publicly accessible third-party data sources) and/or one or more non-publicly accessible data repositories (e.g., non-publicly accessible third-party data sources) and pass the returned user enrichment data to the corpus of user enrichment data.

It shall be noted that the one or more constructed or generated API calls may use one or more user data attributes associated with the target online user (e.g., legal name of the target online user, last name of the target online user, physical address of the target online user, etc.) as query parameters to receive (e.g., germane) user enrichment data back from the one or more publicly accessible data repositories and/or the one or more non-publicly accessible data repositories. Accordingly, S210 may function to compute or predict an urgency (e.g., urgency score) of the target online user and/or a value (e.g., value score) of the target online user based on the corpus of user enrichment data.

2.20 Identifying User Stimulus Data and Pre-Processing User Stimulus Data

S220, which includes identifying and pre-processing user stimulus data, may function to identify, collect, or receive user stimulus data in the form of a user query and pre-process the user stimulus data via one or more pre-processing techniques. In one or more embodiments, the user stimulus data (may also be referred to herein as "user input data" or "user query data") may include input that originates with or may be provided by an online user accessing, at least, part of the system 100 implementing the method 200. In one or more embodiments, input of a user stimulus may initiate a request to the system 100 and/or the method 200 to identify a list of digital profile data (e.g., a relevant list of service provider digital profiles) germane to the user stimulus.

In one or more embodiments, S220 may function to receive a user query or user stimulus via a user interface (e.g., an intuitive search interface, an Internet-accessible user interface) of the online digital profile discovery service that may be digitally accessible by or provided to the user (e.g., a target online user). The user interface (e.g., the intuitive search interface, the Internet-accessible user interface) of the online digital profile discovery service may be implemented via any suitable computing device and/or from including, but not limited to, a mobile computing device, a personal computing device, a web-browser (having a website displayed therein), and any system having a suitable interface for implementing the method 200.

Additionally, or optionally, in one or more embodiments, the user interface may function to implement (or generate) one or more graphical user interface objects that may enable online users to (e.g., continuously) interact with the system 100 implementing the method 200. Additionally, or alternatively, the user interface may function to implement (or generate) one or more text input fields into which a target online user may freely enter a user query, a user stimulus, user input or the like. That is, S220 may function to receive a user stimulus (e.g., user query, user input, or the like) that may have been directed towards (or associated with) one or more graphical user interface objects and/or input fields of the user interface.

In one or more embodiments, the user stimulus may include, but should not be limited to, speech or utterance input, textual input, character input, numerical input, image (or graphical) input, and/or any other suitable type of input. In a preferred embodiment, the user stimulus may comprise one of (or a combination of) a textual input, an utterance input, and/or an image input. For instance, in a non-limiting example, S220 may function to receive user stimulus data or user query data in the form of a user stimulus or user query that may include textual user stimulus data (e.g., text-based user query data). In another non-limiting example, S220 may function to receive user stimulus data (e.g., user query data) that may be in the form of a user stimulus or user query that may include textual user stimulus data (e.g., text-based user query data) and graphical user stimulus data (e.g., graphic-based user query data, digital image-based user query data).

Pre-Processing of User Stimulus Data

Additionally, in one or more embodiments, in response to identifying user stimulus data, S220 may function to implement a user stimulus data pre-processing system. In one or more embodiments of the user stimulus data pre-processing system, the user stimulus data pre-processing system may receive (raw) user stimulus data as input, process the (raw) user stimulus data according to one or more of a plurality of data pre-processing heuristics of the user stimulus data pre-processing system, and output a transformed (or clean) version of the (raw) user stimulus data. For instance, in a non-limiting example, the user stimulus data pre-processing system may function to receive, as input, raw user stimulus data that may include a plurality of relevant (e.g., probative) tokens and a plurality of irrelevant (e.g., non-probative) tokens (e.g., article-type tokens, preposition-type tokens, punctuation-type tokens), and based on one or more data pre-processing heuristics of the user stimulus data pre-processing system, the user stimulus data pre-processing system may function to output a transformed (or clean) version of the (raw) user stimulus data that may remove the plurality of irrelevant tokens (e.g., non-probative tokens).

Accordingly, in one or more embodiments, the output of the user stimulus data pre-processing system may be passed to one or more automated downstream processes or operations as will be further discussed in more detail in S220.

Entity Extraction

Additionally, or alternatively, based on identifying user stimulus data, S220 may function to implement an entity extraction system that may be specifically designed to identify probative terms and label the probative terms into one of a plurality of pre-defined entity categories. A probative term, as referred to herein, preferably relates to a term or token identified within user stimulus data that may inform or operate as evidence towards a given classification or the like. An entity extraction system, as generally referred to herein, may be a heuristics-based entity extraction system or a machine learning-based entity extraction system that may be configured to identify, extract, and/or tokenize user stimulus data into a sequence of distinct tokens and identify/label probative tokens from the sequence of distinct tokens that may fall within one of a plurality of pre-defined entity categories. For instance, in a non-limiting example, a sequence of distinct tokens that may be associated with user stimulus data may be "I am in the United States and looking for a green card", and thus, a pre-trained entity extraction system, may function to identify "United States" as a probative term and label (or annotate or append) the probative term as a location-type attribute (or entity), and additionally, the pre-trained entity extraction system may function to identify "green card" as a probative term and label (or annotate or append) the probative term as an immigration-type attribute (or entity).

Additionally, in one or more embodiments, S210 may function to compile the labeled entity data (e.g., category (or entity) label and probative text value) into a corpus of entity data and preferably associate the corpus of entity data with a unique user stimulus identifier associated with a target user stimulus. It shall be noted that the corpus of entity data may be optionally used in one or more downstream operations or processes (e.g., in S240 and S250).

2.30 Classifying or Labeling User Stimulus Data into Digital Profile Subdomain Categories S230, which includes classifying or labeling user stimulus data, may function to classify (or label) user stimulus data into one or more digital profile subdomain categories via one or more machine learning-based digital profile classification models. In one or more embodiments, S230 may function to implement a multi-classification (digital profile subdomain) machine learning-based model or an ensemble of digital profile machine learning-based classification models that may be configured to receive, as model input, the target piece of user stimulus data or the target piece of pre-processed user stimulus data provided by S220, and compute one or more classification inferences (e.g., one or more machine learning-based digital profile subdomain classification labels) based on one or more features extracted from the user stimulus data.

In one or more embodiments, a digital profile subdomain classification label may be a granular (or increased) classification category of a broader digital profile domain classification label. For example, one or more distinct digital profile subdomain classification labels may be mapped or electronically linked to a broader, distinct digital profile domain classification label. That is, each distinct digital profile domain classification label may define part of a hierarchical classification system that may include coarse or broad top-level domain categories and a plurality of distinct digital profile subdomain classification categories. In a non-limiting example, a first digital profile subdomain classification label (e.g., digital profile subdomain category A) may be an increased granular classification label of a first digital profile domain classification label (e.g., digital profile domain category I).

In another non-limiting example, a first service provider digital profile subdomain classification label (e.g., digital profile subdomain category A (e.g., patents)), a second service provider digital profile subdomain classification label (e.g., digital profile subdomain category B (e.g., trademarks)), and a third service provider digital profile subdomain classification label (e.g., digital profile subdomain category C (e.g., copyright)) may be an increased granular classification category of a first (service provider) digital profile domain classification label (e.g., digital profile domain category I (e.g., intellectual property)).

Accordingly, in one or more embodiments, the multi-classification digital profile subdomain model (or the ensemble of digital profile machine learning-based classification models may function to compute (or predict) one or more (e.g., service provider) digital profile subdomain classification labels (e.g., digital profile subdomain categories) for a target piece of user stimulus data. In other words, S210 may function to compute one or more classification inferences, by one or more machine learning-based classification models, based on one or more features extracted from the user stimulus data, wherein the one or more classification inferences comprise one or more machine learning-based classification labels identified from a plurality of distinct digital profile subdomain classification labels.

Multi-Class Text Classification Machine Learning-Based Model|Digital Profile Subdomain Machine Learning-Based Classification Model In one or more embodiments, in response to identifying user stimulus data (e.g., a target piece of user stimulus data), S230 may function to transmit, as input, the user stimulus data (e.g., the target piece of user stimulus data) to a machine learning-based classification model that may classify (or label) the user stimulus data into one or more digital profile subdomain classification categories. For example, based on identifying user stimulus data (e.g., a target piece of user stimulus data), S230 may function to transmit the user stimulus data (e.g., via an API call) to a digital profile subdomain machine learning-based classification model (e.g., a multi-class text classification machine learning-based model) that may function to classify (or label) the user stimulus data into one or more (e.g., service provider) digital profile subdomain classification categories.

In one or more embodiment, in response to receiving user stimulus data, the digital profile subdomain machine learning-based classification model (e.g., the multi-class text classification machine learning-based model) may compute (or predict) that the user stimulus data may be of a single digital profile subdomain classification category (e.g., a single machine learning-based classification label that may correspond to one of a plurality of predetermined digital profile subdomain classification labels). In other words, in some embodiments, the user stimulus data that may be evaluated by the digital profile subdomain machine learning-based classification model may relate to a single digital profile subdomain classification category (e.g., the user stimulus data inputted into the multi-classification machine learning-based model may be labeled or classified into a single digital profile subdomain classification category (e.g., digital profile subdomain classification label A)).

In one or more embodiment, based on receiving user stimulus data, the digital profile subdomain machine learning-based classification model (e.g., the multi-class text classification machine learning-based model) may predict that the user stimulus data may be of a plurality of digital profile subdomain classification categories (e.g., a plurality of machine learning-based digital profile subdomain classification labels that may correspond to a subset of a plurality of predetermined digital profile subdomain classification labels). In other words, in some embodiments, the user stimulus data evaluated by the digital profile subdomain machine learning-based classification model may correspond to or span across multiple distinct digital profile subdomain classification categories (e.g., multiple distinct digital profile subdomain classification labels). Accordingly, an inference by the multi-class machine learning model may include a plurality of distinct digital profile classification labels.

Additionally, or optionally, each predicted (or computed) machine learning-based digital profile subdomain classification label (e.g., each digital profile subdomain category) for a target piece of user stimulus data may correspond to or be associated with a confidence score that may represent a likelihood that the predicted machine learning-based digital profile subdomain classification label may be correct. Accordingly, in embodiments in which the digital profile subdomain machine learning-based classification model may predict (or compute) a plurality of digital profile subdomain classification labels (or a plurality of machine learning-based classification labels) for a target piece of user stimulus data, S230 may function to prioritize a ranking of the predicted digital profile subdomain classification labels (or machine learning-based classification labels) from a highest confidence score (or value) to a lowest confidence score (or value).

Additionally, or optionally, S230 may function to implement a classification quantity threshold that may tune or prune a plurality of machine learning-based digital profile subdomain classification labels into a smaller subset of machine learning-based digital profile subdomain classification labels if or when the total number of computed machine learning-based digital profile subdomain classification labels exceeds the classification output threshold. For instance, in response to receiving user stimulus data, the digital profile subdomain machine learning-based classification model may predict that the user stimulus data may relate to a plurality of machine learning-based digital profile subdomain classification labels (e.g., ten (10)). In such instance, a classification (or label) quantity threshold may be set to a predetermined maximum number of machine learning-based classification labels (e.g., five (5)), and thus, S230 may function to tune (or prune) the plurality of machine learning-based digital profile subdomain classification labels until the predetermined maximum number of digital profile subdomain classification labels may be satisfied.

It shall be noted that, in one or more embodiments, tuning or pruning the plurality of digital profile subdomain classification labels into a smaller subset may be based on confidence scores (e.g., take the predetermined maximum number of digital profile subdomain classification labels that have the highest confidence scores).

Ensemble of Machine Learning-Based Classification Models

In one or more embodiments, in response to identifying a target piece of user stimulus data, S230 may function to implement an ensemble of (e.g., service provider) digital profile domain classification models in which each distinct (e.g., service provider) digital profile domain classification model of the ensemble may be trained to output a distinct (e.g., service provider) digital profile domain classification label and a corresponding probability domain match value for the distinct (e.g., service provider) digital profile domain classification label. In a non-limiting example, the ensemble of digital profile domain classification models may be capable of identifying a plurality of distinct digital profile domain classifications, such as, domain "A", domain "B", domain "C", domain "D", and domain "E", and thus the ensemble of digital profile domain classification models may comprise five distinct classification models that may correspond to each distinct digital profile domain classification (e.g., domain "A" classification model, domain "B" classification model, domain "C" classification model, domain "D" classification model, and domain "E" classification model). In such example, each of the distinct digital profile domain classification models may function to process a target piece of user stimulus data and generate a corresponding classification label and a corresponding domain match probability value associated with the respective classification label (e.g., domain "A" classification model: 95% domain "A", domain "B" classification model: 30% domain "B", domain "C" classification model: 20% domain "C", domain "D" classification model: 90% domain "D", domain "E": classification model: 5% domain "E").

Additionally, or optionally, in one or more embodiments, S23o may function to apply a predetermined digital profile domain threshold to the output of each distinct digital profile domain classification model to filter the results or predictions to relevant digital profile domain classification labels (e.g., Domain "A" or Domain "A" and Domain "D").

Additionally, or alternatively, in one or more embodiments, S23o may function to selectively pass or route the target piece of user stimulus data to one or more digital profile subdomain multi-classification models in accordance with the domain classifications labels of the target piece of user stimulus data. For example, based on the domain match probability value for domain "A" satisfying the predetermined digital profile domain threshold, S230 may function to pass or route the target piece of user stimulus data to a digital profile subdomain multi-classification model specifically designed and trained on digital profile subdomains of domain "A". In another example, based on the domain match probability value for domain "A" and the domain match probability value for domain "D" satisfying the predetermined digital profile domain threshold, S230 may function to pass or route the target piece of user stimulus data to both of a first digital profile subdomain multi-classification model specifically designed and trained on digital profile subdomain categories of domain "A" and a second digital profile subdomain multi-classification model specifically designed and trained on digital profile subdomains of domain "D". Accordingly, in either example, the output of the digital profile subdomain machine learning-based classification model(s) may be a labeling of the target user stimulus data into one or more digital profile subdomain categories (e.g., one or more machine learning-based classification labels).

It shall be noted that S230 may function to apply a predetermined digital profile subdomain threshold to the one or more outputs of each distinct digital profile subdomain classification model in analogous ways described above.

2.40 Posing Subdomain-Informed Queries to Target Online Users|Search Query Construction S240, which includes posing subdomain-informed queries, may function to selectively search a corpus of subdomain query data based on the machine learning-based digital profile subdomain classification labels generated by S230 and selectively pose one or more subdomain-informed queries to a target online user based on the search. A subdomain-informed query, as generally referred to herein, may be in the form of a question or any other form that may be posed to a target online user that may prompt the target online user to provide additional information or content data related to the subdomain-informed query. In one or more embodiments, S240 may function to intelligently search a corpus of subdomain query data by constructing and executing a search query that includes, as search parameters, the machine learning-based digital profile subdomain classification labels provided by S230.

Corpus of Subdomain Query Data

In one or more embodiments, a corpus of subdomain query data, as generally referred to herein, may include subdomain-informed queries indexed according to each of a plurality of digital profile subdomain classification labels. For instance, a first set of distinct subdomain-informed queries (e.g., one or more subdomain-informed queries, a plurality of subdomain-informed queries, etc.) may be indexed (e.g., digitally mapped or electronically linked) according to a first digital profile subdomain classification label and a second set of subdomain-informed queries (e.g., one or more subdomain-informed queries, a plurality of subdomain-informed queries, etc.) may be indexed (e.g., digitally mapped or electronically linked) according to a second digital profile subdomain classification label. It shall be noted that, in one or more embodiments, S240 may function to search, via one or more digital profile subdomain classification labels, the corpus of subdomain query data that may include a plurality of distinct (e.g., service provider) digital profile subdomain classification labels and a distinct set of subdomain-informed queries digitally mapped (or electronically linked) to each of the plurality of distinct digital profile subdomain classification labels.

It shall be further noted that, in one or more embodiments, the plurality of distinct digital profile subdomain classification labels of the corpus of subdomain query data may be substantially similar (or equivalent) to the plurality of distinct digital profile subdomain classification labels (e.g., the machine learning-based classification labels) mentioned in S230. It shall be further noted that, in one or more embodiments, the one or more subdomain-informed queries corresponding to a subject digital profile subdomain classification label may be specifically designed/constructed to obtain additional information or informative content relating to the digital profile subdomain category corresponding to the subject digital profile subdomain classification label.

Search Query Construction

Figure 4:
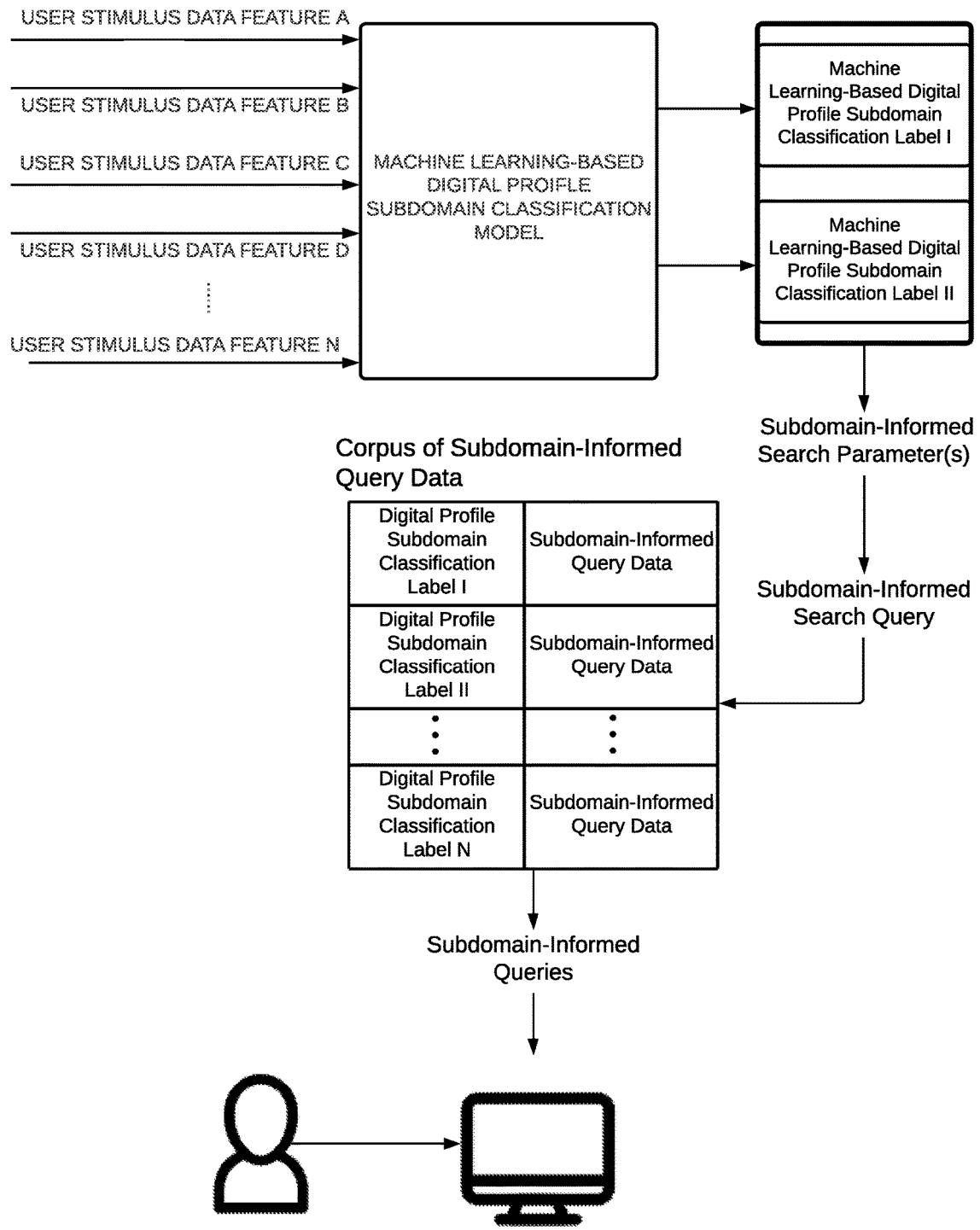
FIG. 4 illustrates an example schematic for constructing and executing a subdomain-informed search query in accordance with one or more embodiments of the present application.

In a first implementation, S240 may function to (e.g., automatically) construct a subdomain-informed search query that, when executed, may function to search a corpus of subdomain query data and match (or pair) the search query with a list of subdomain-informed queries (e.g., a list of subdomain-informed query data) based on the search parameters of the subdomain-informed search query, as shown generally by way of example in FIG. 4. In a non-limiting example, S230 may function to compute that a target piece of user stimulus data may be of a (e.g., single) digital profile subdomain classification label and S240 may function to construct a search query (e.g., a regex search query or the like) that includes the (e.g., single) machine learning-based digital profile subdomain label or a similarly-derived value as a search parameter (e.g., S240 may function to derive a search parameter based on the machine learning-based classification label and define the subdomain-informed search query using the search parameter). Accordingly, S240 may function to execute the subdomain-informed search query and based on executing the subdomain-informed search query, S240 may function to search the corpus of subdomain query data and match (or pair) the search query with a list of subdomain-informed queries corresponding to the search parameter (e.g., the machine learning-based digital profile subdomain classification label).

In another non-limiting example, S230 may function to compute that a target piece of user stimulus data may be of a plurality of distinct digital profile subdomain classification labels and S240 may function to construct a subdomain-informed search query that includes each of the plurality of distinct (e.g., machine learning-based) digital profile subdomain classification labels as search parameters (e.g., S240 may function to derive a distinct search parameter for each of the plurality of machine learning-based classification labels and define the subdomain-informed search query using the search parameters). Accordingly, S240 may function to execute the subdomain-informed search query and based on executing the subdomain-informed search query, S240 may function to search the corpus of subdomain query data based on the plurality of distinct machine learning-based digital profile subdomain labels included in the search query and match (or pair) the subdomain-informed search query with a list of subdomain-informed queries for each of the plurality of digital profile subdomain classification labels (e.g., the list of subdomain-relevant queries may include a first distinct set of subdomain-informed queries for a first digital profile subdomain classification label of the plurality of distinct digital profile subdomain classification labels; a second distinct set of subdomain-informed queries for a second digital profile subdomain classification label of the plurality of distinct digital profile subdomain categories; and a third distinct set of subdomain-informed queries for a third digital profile subdomain classification label of the plurality of distinct digital profile subdomain categories, etc.).

In a second implementation, S240 may function to (e.g., automatically) construct a search query (for a target piece of user stimulus data) that may include one or more digital profile subdomain classification labels provided by S230 and/or one or more Boolean or logical search expressions that may contain (or evaluate) one or more pieces of entity extraction data (identified by S210) as search parameters. In other words, S240 may function to construct a subdomain-informed search query that may selectively prevent S240 from returning subdomain-informed queries that may have been prematurely satisfied by a target piece of user stimulus data based on the one or more pieces of extracted entity data identified by S210. For example, based on S210 identifying that a target piece of user stimulus data may have included location-type data and S230 computing that the target piece of user stimulus data may be of a plurality of digital profile subdomain classification labels, S240 may function to construct a subdomain-informed search query that, when executed, matches (or pairs) the subdomain-informed search query with all subdomain-relevant queries corresponding to each of the plurality of digital profile subdomain classification labels except for location-type queries (e.g., selectively filtering out one or more target-types of subdomain-informed queries).

Posing Subdomain-Relevant Queries

In one or more embodiments, based on identifying a list of subdomain-informed queries, S240 may function to pose the list of subdomain-informed queries to a target online user associated with the user stimulus data (or user stimulus). In a non-limiting example, S240 may function to display, on a web-based user interface of the system 100, the list of subdomain-informed queries returned from the executed search query (in bulk) and while displaying the list of subdomain-informed queries, S240 may function to receive a user response to (preferably) each subdomain-informed queries included in the list of subdomain-informed queries.

In another non-limiting example, S240 may function to display, via a web-based user interface of the system 100, a sequence of subdomain-informed queries on a per subdomain-informed query basis. That is, a first subdomain-informed query of the sequence of subdomain-informed queries may be individually (or solely) displayed on the web-based user interface and a subsequent subdomain-informed query may not be displayed on the web-based user interface until a user responds to a currently displayed subdomain-informed query is received by the system 100 and/or the method 200.

Additionally, or alternatively, S240 may function to collect responses to the one or more subdomain queries posed to the target online user and define or construct a user response corpus based thereon.

Figure 3:
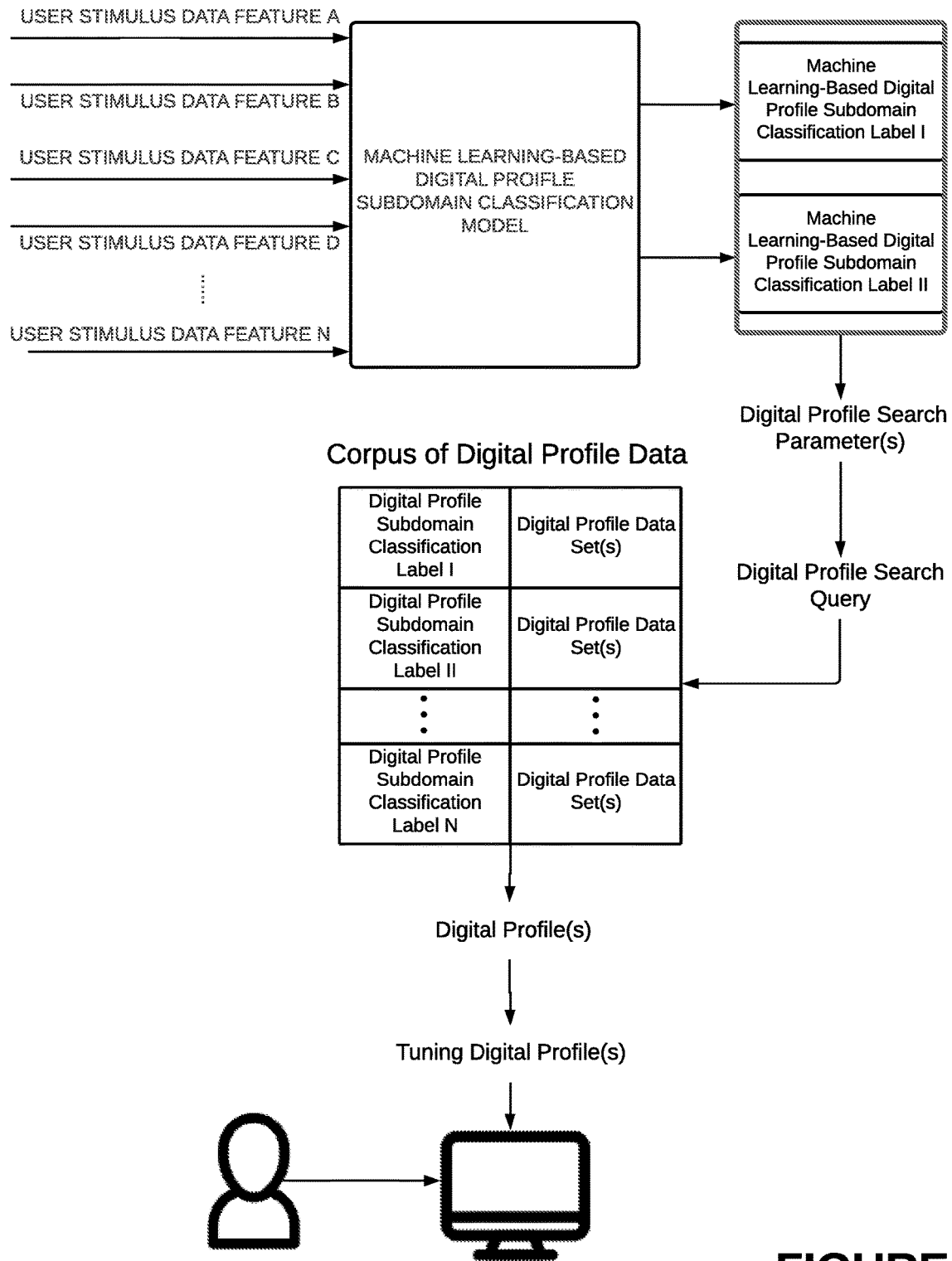
FIG. 3 illustrates an example schematic for constructing and executing a digital profile search query in accordance with one or more embodiments of the present application.

2.50 Displaying Digital Profile Data|Searching a Digital Profile Corpus Based on Digital Profile Corpus Queries S250, which includes displaying digital profiles, may function to selectively search a corpus of digital profile data based (at least) on the machine learning-based digital profile subdomain classification label(s) provided by S230 and may selectively display one or more digital profiles via a web-based user interface (of the system 100) based on the search. In one or more embodiments, S250 may function to intelligently search a corpus of digital profile data by automatically constructing and executing a digital profile search query that includes one or more pieces of data provided by S230 and/or S240 as search parameters, as shown generally by way of example in FIG. 3. It shall be noted that a digital profile (e.g., a service provider digital profile) may also be referred to herein as an online digital account (e.g., a service provider digital account).

Corpus of Digital Profile Data|Corpus of Digital Account Data

In one or more embodiments, a corpus of digital profile data may include digital profile data indexed according to one or more distinct digital profile subdomain classification labels within a specifically-configured digital profile database. For instance, a first set of digital profile data (e.g., one or more service provider digital profiles, a plurality of service provider digital profiles, etc.) may be indexed (e.g., digitally mapped or electronically linked) according to a first digital profile subdomain classification label and a second set of digital profile data (e.g., one or more service provider digital profiles, a plurality of service provider digital profiles, etc.) may be indexed (e.g., digitally mapped or electronically linked) according to a second digital profile subdomain classification label. It shall be noted that one or more digital profiles or digital accounts that may be included in the corpus of digital profile data may be associated with a plurality of digital profile subdomain classification labels (e.g., digital profile "A" may be indexed according to a first digital profile subdomain classification label and digital profile "A" may also be indexed according to a second digital profile subdomain classification label distinct from the first digital profile subdomain classification label). In other words, one or more digital profiles (or service provider digital profiles) may be associated with more than one digital profile subdomain classification label and/or more than one digital profile domain classification label.

Optionally, in one or more embodiments, digital content items (e.g., digital resource assets, digital content assets) may be digitally linked or mapped to one or more of the plurality of digital profiles included in the corpus of digital profile data. In a non-limiting example, a digital content item (or digital resource asset) that may be linked or mapped to a target digital profile may be probative content artifacts such as, but not limited to, one or more marketing artifacts, one or more pricing (or cost) artifacts, or any other content-type artifacts.

It shall be noted that, in one or more embodiments, the plurality of distinct digital profile subdomain classification labels of the corpus of digital profile data may be substantially similar (or equivalent) to the plurality of distinct digital profile subdomain classification labels mentioned in S230 and S240. It shall be further noted that, in one or more embodiments, the one or more digital profiles (or digital profile data) corresponding to a subject digital profile subdomain classification label may be germane to the digital profile subdomain category associated with the subject digital profile subdomain classification label.

Digital Profile Search Query Types

In a first implementation, S250 may function to automatically construct a digital profile search query (for a target piece of user stimulus data) that, when executed, may function to (e.g., automatically) search the corpus of digital profile data and pair or match the digital profile search query to a list of digital profile data sets (e.g., one or more service provider digital profiles, a plurality of digital accounts, or the like). In a non-limiting example of the first implementation, S230 may function to compute (e.g., predict) one or more machine learning-based digital profile subdomain classification labels for a target piece of user stimulus data, and S250 may function to construct a digital profile search query that includes each of the one or more machine learning-based digital profile subdomain classification labels as search parameters (e.g., S250 may function to derive a search parameter based on a machine learning-based classification label and define the digital profile search query using the search parameter). Accordingly, based on S250 executing the constructed digital profile search query, S250 may function to evaluate (or search) the corpus of digital profile data to pair or match the constructed digital profile search query to a set of digital profiles that may be displayed on a web-based user interface according to one or more display prioritization criteria as described in more detail below.

In a second implementation, via a multi-stage search, S250 may function to automatically construct a digital profile search query (for a target piece of user stimulus data) that, when executed, may function to (e.g., automatically) search the corpus of digital profile data and pair (or match) the digital profile search query to a list of digital profile data sets (e.g., one or more service provider digital profiles, a plurality of digital accounts, or the like). In a non-limiting example of the second implementation, S230 may function to compute one or more machine learning-based digital profile subdomain classification labels for a target piece of user stimulus data and S250 may function to construct a digital profile search query that includes each of the one or more machine learning-based digital profile subdomain classification labels as search parameters. Accordingly, at a first search stage of the second implementation, based on executing the constructed digital profile search query, S250 may function to evaluate the corpus of digital profile data to pair or match the constructed digital profile search query to a preliminary set of digital profile data (e.g., a preliminary set of digital profiles) that may be concealed (or not exposed) to a target online user.

Additionally, at a second search stage of the second implementation, S250 may function to reduce or pare down the preliminary set of digital profiles based on one or more digital profile tuning parameters. In one or more embodiments, one or more tuning parameters may be identified based on evaluating the target piece user stimulus data (or the corpus of extracted entity data for the target piece of user stimulus data) against a service-defined vocabulary corpus. A service-defined vocabulary data corpus may include a plurality of probative (tuning) tokens and/or a plurality of probative (tuning) text strings in which each of the plurality of probative (tuning) tokens and/or each of the plurality of probative (tuning) text strings may be evaluated against the target piece of user stimulus data (or the corpus of extracted entity data for the target piece of user stimulus data). In some embodiments, S250 may function to identify or derive digital profile tuning parameters based on at least on the one or more classification labels together with data extracted and/or derived from the user response corpus.

In such implementation, S250 may function to identify one or more tuning parameters based on token matching (e.g., a token (or text string) appears in both the target piece of user stimulus data and the service-defined vocabulary corpus) or semantically-similar token matching (e.g., a semantically-similar token (or text string) appears in both the target piece of user stimulus and the service-defined vocabulary corpus). Accordingly, if or when one or more tuning parameters may be identified, S250 may function to reduce or pare down or transform the preliminary set of digital profiles to generate a tuned list of digital profiles that may be exposed to a target user via a web-based interface of the online digital profile discovery service. For example, a preliminary data set of digital profiles may include service provider digital profile A, service provider digital profile B, service provider digital profile C, and service provider digital profile D and S250 may function to identify a tuning parameter that may cause a removal of service provider digital profiles not (e.g., directly) related to the tuning parameter, thus a tuned list of digital provides may include service provider digital profile A and service provider digital profile D.

In a third implementation, S250 may function to automatically construct a digital profile search query (for a target piece of user stimulus data) that, when executed, may function to automatically search the corpus of digital profile data and pair (or match) the digital profile search query to a list of digital profiles (e.g., a list of digital profile data). In one or more embodiments of the third implementation, before constructing the digital profile search query, S250 function to evaluate user responses to each of the subdomain-informed queries to identify whether the digital profile subdomain classification label to which the subdomain-relevant query may correspond with may be in-scope or out-of-scope in view of the user response. Accordingly, if the user responses to the sub-domain relevant queries are determined to be in-scope with the predicted (e.g., machine learning-based) digital profile subdomain classification labels provided by S230, S250 may function to automatically construct a digital profile search query that includes, as search parameters, the digital profile subdomain classification labels provided by S230.

Additionally, or alternatively, in one or more embodiments, if one or more user responses to the one or more subdomain-relevant queries may have been identified to be out-of-scope or misaligned to one or more digital profile subdomain classification labels to which the subdomain-relevant queries may correspond, S250 may function to automatically invalidate one or more digital profile subdomain classification labels predicted by S230 and construct a digital profile search query that includes updated (or new) digital profile subdomain classification labels (as search parameters) for each of the out-of-scope or misaligned digital profile subdomain classification labels. Accordingly, in such embodiments, Ss250 may function to construct a digital profile search query that may be informed by one or more additional search parameters derived based on the user response corpus. It shall be noted that in one or more embodiments of the third implementation, S250 may function to tune the list of digital profiles in analogous ways described above.

In a fourth implementation, S250 may function to (e.g., automatically) construct a multi-part digital search query that, when executed, may function to (e.g., automatically) search the corpus of digital profile data and pair (or match) the digital profile search query to a tuned list of digital profiles that may be displayed on a web-based interface of the online digital profile discovery service. In one or more embodiments of the fourth implementation, a first part of the multi-part digital search query may include search parameters that may be used to selectively identify a subset of digital profiles from the corpus of digital profiles and a second part of the multi-part digital search query may include tuning parameters that may be used to reduce or pare down the subset of selectively identified digital profiles in analogous ways described above.

Prioritization of Digital Profiles|Prioritization of Digital Accounts

In one or more embodiments, S250 may function to display digital profiles (or digital accounts) on a web-based user interface of the online digital profile discovery service according to one or more display prioritization criteria. In a non-limiting example, one of the one or more display prioritization criteria may be to display digital profiles (e.g., service provider digital profiles) in a descending order based on digital profile greatest match (or relevancy) to the one or more computed digital profile subdomain classification labels associated with a target piece of user stimulus data.

For instance, in one or more embodiments, S230 may function to compute that a target piece of user stimulus data may be associated with digital profile subdomain classification label A, digital profile subdomain classification label B, and digital profile subdomain classification label C. Thus, S250 may function to search the corpus of digital profile data (based on the digital profile subdomain classification labels) and match (or pair) the target piece of user stimulus data to three (3) digital profiles. Accordingly, in such instance, the first digital profile may correspond to digital profile classification label C; the second digital profile may correspond to digital profile subdomain classification label A, digital profile subdomain classification label B, and digital profile subdomain classification label C; and the third digital profile may correspond to digital profile subdomain classification label A and digital profile subdomain classification label B. Accordingly, S250 may function to display, via the web-based user interface, in a descending order (e.g., in a top-to-bottom direction), the second digital profile, the third digital profile, and the first digital profile.

Additionally, or alternatively, S250 may function to prioritize search query data of a plurality of distinct users based on service provider-prioritization criteria. In such embodiments, a digital account of a service provider may include one or more criteria that inform a prioritization of search query data. In one or more embodiments, the service-provider-prioritization criteria may be configured or set based on desired attributes of an online user (e.g., entity size, urgency, user industry, and/or the like) and/or of the search query data. Accordingly, S250 may function to prioritize or re-prioritize search query data of the plurality of distinct users in alignment with or based an application of the service provider-prioritization criteria.

It shall be noted, in one or more embodiments, a digital profile (or digital account) that may be displayed on the web-based user interface may optionally display the one or more digital profile subdomain classification labels and the digital content items (e.g., digital resource assets) that may correspond to the digital profile.

2.60 Transmitting User Communication Requests

S260, which optionally includes transmitting user communication requests, may function to selectively transmit a user communication request to one of a plurality of digital profiles (e.g., digital accounts) provided or displayed by S250. In one or more embodiments, based on detecting a user input request to contact (e.g., connect with) a target subscriber (e.g., a target entity, a target service provider) of the online digital profile discovery service, S260 may function to transmit a user communication request to a digital profile or digital account associated with the target subscriber (e.g., the target entity, the target service provider).

In one or more embodiments, a user communication request may be a communication request transmitted (by the system 100 implementing the method 200) to a target digital profile (or target digital account) associated with a target entity or the like. It shall be noted that, in one or more embodiments, a user communication request may include one or more of a (e.g., follow-up) request by the online user to have a target entity associated with the digital profile contact them via one or more communication channels, a listing of the subdomain-informed queries and the user responses to the subdomain-informed queries, and optionally any additional user-provided data that may provide additional context to the target entity.

In a first implementation, while displaying a plurality of digital service provider accounts on a web-based user interface of the online digital profile discovery service, S260 may function to (e.g., individually) display one of the plurality of digital service provider accounts based on detecting a user selection to the one of the plurality of digital service provider accounts. Accordingly, in such implementation, while displaying the one of the plurality of digital service provider accounts, S260 may function to transmit a user communication request to the one of the plurality of digital service provider accounts based on receiving a user input request to communicate with a target entity associated with the one of the plurality of digital service provider accounts.

In a second implementation, for fast-pairing, while displaying a plurality of digital profiles on a web-based user interface of the service provider discovery service, S260 may function to transmit a user communication request to one of the plurality of digital profiles based on identifying a request by a target online user to communicate with a target entity associated with the one of the plurality of digital profiles.

It shall be noted that S260 may optionally function to build a corpus of training data based on user communication requests. In such embodiments, S260 may function to identify user stimulus data associated with each user communication request and augment the user stimulus data with metadata, such as labels (e.g., the digital profile subdomain classification labels associated with the digital profile or digital account to which a corresponding user communication request was transmitted). Accordingly, S260 may function to periodically train and/or update one or more of the production-implemented machine learning-based models described above to improve digital profile subdomain classification predictions of user stimulus data based on the corpus of training data.

Optionally, in one or more embodiments, in response to a digital profile or digital account receiving a user communication request, S260 may function to automatically generate and/or transmit a pre-constructed response on behalf of a digital entity associated with the digital profile to which the user communication request was transmitted.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for machine learning-informed pairings of user stimuli-to-online digital profile data, the computer-implemented method comprising:
receiving, via a web-enabled user interface, user stimulus data associated with an input of an online user;
computing one or more classification inferences, by one or more machine learning-based classification models, based on one or more features extracted from the user stimulus data, wherein the one or more classification inferences comprise one or more machine learning-based classification labels identified from a plurality of distinct digital profile subdomain classification labels;
automatically constructing, by one or more computers, a digital profile search query, wherein constructing the digital profile search query includes:
(i) deriving one or more digital profile search parameters based on the one or more machine learning-based classification labels, and
(ii) defining the digital profile search query using, at least, the one or more digital profile search parameters;
automatically executing, by the one or more computers, the digital profile search query, wherein the executing of the digital profile search query includes:
(a) automatically searching, by the one or more computers, a digital profile database comprising a corpus of digital profile data based on the digital profile search parameters; and
(b) selectively pairing the digital profile search query to one or more digital profiles identified from the corpus of digital profile data based on the digital profile search parameters; and
displaying, via the web-enabled user interface, the one or more digital profiles based on the selective pairing.

2. The computer-implemented method according to claim 1, wherein
the corpus of digital profile data is indexed according to the plurality of distinct digital profile subdomain classification labels, and
each distinct digital profile classification label indexed in the corpus of digital profile data corresponds to a distinct set of digital profiles.

3. The computer-implemented method according to claim 1, wherein
the one or more classification inferences comprising the one or more machine learning-based classification labels includes:
a first machine learning-based classification label corresponding to a first digital profile subdomain classification label of the plurality of distinct digital profile subdomain classification labels, wherein the first digital profile subdomain classification label is associated with a first digital profile domain; and
a second machine learning-based classification label corresponding to a second digital profile subdomain classification label of the plurality of distinct digital profile subdomain classification labels, wherein the second digital profile subdomain classification label is outside the scope of the first digital profile domain.

4. The computer-implemented method according to claim 3, wherein
the digital profile search query includes a first digital profile search parameter value based on the first machine learning-based classification label and a second digital profile search parameter value based on the second machine learning-based classification label; and
selectively pairing the digital profile search query to the one or more digital profiles, includes:
(a) identifying a first set of digital profiles based on the first digital profile search parameter value, wherein each digital profile of the first set of digital profiles includes a first digital profile label that is associated with the first digital profile search parameter value;
(b) identifying a second set of digital profiles based on the second digital profile search parameter value, wherein each digital profile of the second set of digital profiles includes a second digital profile label that is associated with the second digital profile search parameter value; and
(c) identifying a third set of digital profiles based on a combination of both of the first digital profile search parameter value and the second digital profile search parameter value, wherein each digital profile of the third set of digital profiles includes both the first digital profile label and the second digital profile label.

5. The computer-implemented method according to claim 4, wherein
displaying the one or more digital profiles includes displaying the first set of digital profiles, the second set of digital profiles, and the third set of digital; and
the digital profiles associated with the first set of digital profiles, the second set of digital profiles, and the third set of digital profiles are visually arranged on the Internet-accessible user interface according to a digital profile prioritization criterion.

6. The computer-implemented method according to claim 5, wherein
the digital profile prioritization criteria visually arrange the digital profiles associated with the first set of digital profiles, the second set of digital profiles, and the third set of digital profiles in a descending order based on a digital profile label match frequency.

7. The computer-implemented method according to claim 1, wherein
a search syntax of the digital profile search query is derived from one or more search requirements of the corpus of digital profile data.

8. The computer-implemented method according to claim 1, wherein
selectively pairing the digital profile search query to the one or more digital profiles includes:
pairing, at a first pairing stage, the digital profile search query with a plurality of digital profiles identified from the corpus of digital profile data, wherein at the first pairing stage the plurality of digital profiles is not displayed on the web-enabled accessible user interface;
pairing, at a second pairing stage, the digital profile search query with the one or more digital profiles that is a subset of the plurality of digital profiles identified at the first pairing stage, wherein the second paring stage filters out or removes one or more digital profiles of the plurality of digital profiles identified by the first pairing stage based on one or more digital profile tuning parameters.

9. The computer-implemented method according to claim 1, further comprising:
automatically constructing, by one or more computers, a subdomain-informed search query, wherein constructing the subdomain-informed search query includes:
(iii) deriving one or more subdomain-informed search parameters based on the one or more machine learning-based classification labels, and
(iv) defining the subdomain-informed search query using, at least, the one or more subdomain-informed search parameters.

10. The computer-implemented method according to claim 9, further comprising:
automatically executing, by the one or more computers, the subdomain-informed search query, wherein the executing of the subdomain-informed search query includes:
(a) automatically searching, by the one or more computers, a digital profile database comprising a corpus of subdomain-informed query data based on the subdomain-informed search parameters; and
(b) selectively pairing the subdomain-informed query to one or more subdomain-informed queries identified from the corpus of subdomain-informed query data based on the subdomain-informed search parameters; and
displaying, via the web-enabled user interface, the one or more subdomain-informed queries based on the selective pairing.

11. The computer-implemented method according to claim 1, further comprising:
while displaying the one or more digital profiles;
receiving a user communication request by a target online user to communicate with a target entity associated with at least one of the one or more digital profiles; and
in response to identifying the user communication request, electronically transmitting the user communication request to the at least one of the one or more digital profiles.

12. The computer-implemented method according to claim 1, further comprising:
while displaying the one or more digital profiles, detecting a user selection to one of the one or more digital profiles;
in response to detecting the user section, displaying the one of the one or more digital profiles in an expanded view based on the user selection; and
while displaying the one of the one or more digital profiles in the expanded view;
transmitting a user communication request to the one of the one or more digital profiles.

13. The computer-implemented method according to claim 1, wherein
the user stimulus data comprises textual data.

14. The computer-implemented method according to claim 1, wherein
the user stimulus data comprises one or more strings of textual data and digital image data.

15. The computer-implemented method according to claim 1, wherein
the user stimulus data comprises utterance data;
the computer-implemented method further comprises:
converting the utterance data to textual data.

16. A computer-implemented method for machine learning-informed pairings of user stimuli-to-online digital profile data, the computer-implemented method comprising:

at an online digital profile discovery service:

receiving, via an Internet-accessible user interface, user stimulus data associated with an input of an online user;

computing one or more classification inferences, by one or more machine learning-based classification models, based on one or more features extracted from the user stimulus data, wherein the one or more classification inferences comprise one or more machine learning-based classification labels identified from a plurality of distinct digital profile subdomain classification labels;

automatically constructing, by one or more computers, a digital profile search query, wherein constructing the digital profile search query includes:

(ii) defining the digital profile search query based on the one or more machine learning-based classification labels;

automatically executing, by the one or more computers, the digital profile search query, wherein the executing of the digital profile search query includes:

(a) automatically searching, by the one or more computers, a database comprising a corpus of digital profile data based on the digital profile search parameters; and (b) selectively pairing the digital profile search query to a plurality of digital profiles identified from the corpus of digital profile data based on the digital profile search parameters; and displaying, via the Internet-accessible user interface, a subset of the plurality of digital profiles based on one or more digital profile tuning parameters defined by the online digital profile discovery service.

17. The computer-implemented method according to claim 16, wherein defining the digital profile search query further includes:

formatting the digital profile search query into a machine-recognizable format based on one or more search syntax requirements of the corpus of digital profile data.

18. The computer-implemented method according to claim 16, wherein the corpus of digital profile data is indexed according to the plurality of distinct digital profile subdomain classification labels, and each distinct digital profile classification label indexed in the corpus of digital profile data corresponds to a distinct set of digital profiles.

19. A computer-implemented method for machine learning-informed pairings of user stimuli-to-online digital profile data, the computer-implemented method comprising:

receiving, via an Internet-accessible user interface, user stimulus data associated with an input of an online user;

computing one or more classification inferences, by one or more machine learning-based classification models, based on one or more features extracted from the user stimulus data, wherein the one or more classification inferences comprise one or more machine learning-based classification labels identified from a plurality of distinct digital profile subdomain classification labels;

automatically constructing, by one or more computers, a digital profile search query and a subdomain-informed search query, wherein constructing the digital profile search query and the subdomain-informed search query includes:

(i) deriving one or more digital profile search parameters and one or more subdomain-informed search parameters based on the one or more machine learning-based classification labels, and (ii) defining the digital profile search query based on the digital profile search parameters and defining the subdomain-informed search query based on the subdomain-informed search parameters;

automatically executing, by the one or more computers, the digital profile search query and the subdomain-informed search query, wherein the executing of the digital profile search query and the subdomain-informed search query includes:

(a) selectively pairing the subdomain-informed search query to one or more subdomain-informed queries identified from the corpus of subdomain-informed query data based on the subdomain-informed search parameters;

(b) selectively pairing the digital profile search query to one or more digital profiles identified from the corpus of digital profile data based on both of the digital profile search parameters and one or more user responses to the subdomain-informed queries; and displaying, via the Internet-accessible user interface, the one or more digital profiles based on the selective pairing.

20. The computer-implemented method according to claim 19, wherein the corpus of digital profile data is indexed according to the plurality of distinct digital profile subdomain classification labels, and the corpus of subdomain-informed query data is indexed according to the plurality of distinct digital profile subdomain classification labels.

* * * * *